(12) United States Patent
Hahn et al.

(10) Patent No.: US 7,967,341 B2
(45) Date of Patent: Jun. 28, 2011

(54) INTERLEAF, IN PARTICULAR FOR A BOOK-LIKE IDENTITY DOCUMENT, PROCESS AND DEVICE FOR PRODUCING AN INTERLEAF

(75) Inventors: Enrico Hahn, Berlin (DE); Carsten Senge, Kiel (DE)

(73) Assignee: Bundesdruckerei GmbH, Berlin (DE)

( * ) Notice: Subject to any disclaimer, the term of this patent is extended or adjusted under 35 U.S.C. 154(b) by 811 days.

(21) Appl. No.: 11/791,240

(22) PCT Filed: Nov. 10, 2005

(86) PCT No.: PCT/EP2005/012076
§ 371 (c)(1),
(2), (4) Date: Dec. 26, 2007

(87) PCT Pub. No.: WO2006/053679
PCT Pub. Date: May 26, 2006

(65) Prior Publication Data
US 2008/0193713 A1    Aug. 14, 2008

(30) Foreign Application Priority Data
Nov. 19, 2004   (DE) .......................... 10 2004 055 973

(51) Int. Cl.
*B42D 1/00*     (2006.01)
*B42D 15/00*    (2006.01)
*B42D 15/10*    (2006.01)
*G09C 3/00*     (2006.01)

(52) U.S. Cl. .......... 283/107; 281/2; 281/15.1; 283/63.1; 283/72; 283/74; 283/75; 283/94

(58) Field of Classification Search ............... 281/2, 3.1, 281/15.1, 21.1, 26, 27, 51; 283/63.1, 72, 283/74, 75, 94, 107, 109, 117; 412/3, 17, 412/28, 35
See application file for complete search history.

(56) References Cited

U.S. PATENT DOCUMENTS

| 4,718,969 | A  | * | 1/1988  | Lazar ............................. 412/3 |
| 5,865,919 | A  |   | 2/1999  | Megchelsen et al. |
| 6,135,503 | A  | * | 10/2000 | Lob et al. ....................... 283/74 |
| 6,607,810 | B1 |   | 8/2003  | Boich |

FOREIGN PATENT DOCUMENTS

| EP | 0 430 282 A2 | 6/1991 |
| EP | 1 008 459 A1 | 6/2000 |
| EP | 1 380 442 A1 | 1/2004 |
| EP | 1 516 749 A2 | 3/2005 |

* cited by examiner

*Primary Examiner* — Dana Ross
*Assistant Examiner* — Justin V Lewis
(74) *Attorney, Agent, or Firm* — Kriegsman & Kriegsman

(57) ABSTRACT

An interleaf is disclosed, as well as a process and device for producing an interleaf, in particular for a book-like identification document. At least one additional layer (26) made of thermally resistant plastics is laminated onto at least one layer (24) made of thermoplastic elastomer, a section (42) of the at least one additional layer (24) being integrated into a folding region (31) without producing a thickened region on the outer side of the at least one layer (24) made of thermoplastic elastomer.

15 Claims, 4 Drawing Sheets

Figure 1:
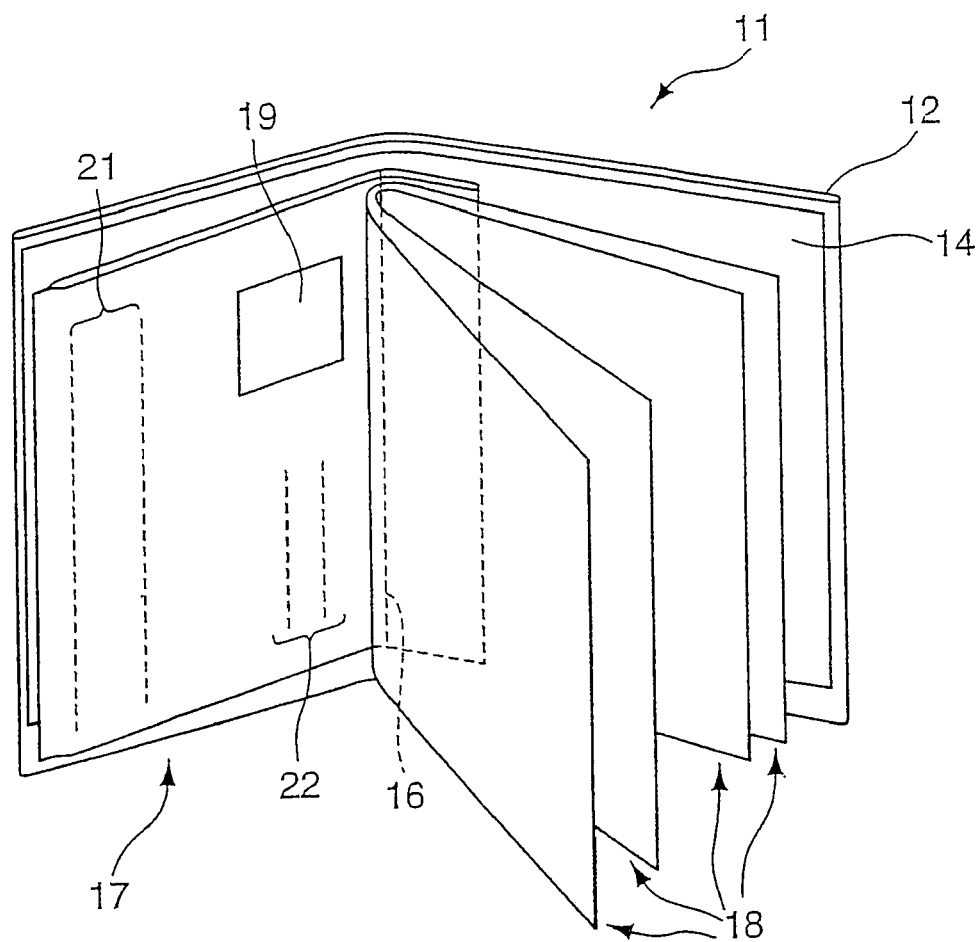

INTERLEAF, IN PARTICULAR FOR A BOOK-LIKE IDENTITY DOCUMENT, PROCESS AND DEVICE FOR PRODUCING AN INTERLEAF

The invention is based on an Interleaf, in particular for a book-like identity document, a process and a device for producing an interleaf, in particular for an identity document, according to the preamble of the independent claims.

Identity documents are understood to include, for example, passports, book-like personal identity documents, drivers' licenses, preliminary personal documents or the like. In general, these comprise a plastic, paperboard or linen cover and data pages made of paper and/or plastic. The data pages are fixed to the end paper or to the inner side of the cover by means of a seam. The data pages have a personalization data page, on which the most important personal data and the picture of the holder of the identity document are arranged. Further data pages can contain entries relating to the holder or free areas for subsequent entries, such as visas. The data pages can consist of different materials and have a different thickness.

EP 0 430 282 A1 has already disclosed multilayer identity cards which contain intermediate layers of thermoplastic elastomer, such as of thermoplastic polyurethane, and are surrounded by PC, PET or ABS layers, for example. These layers, arranged continuously above one another, have the disadvantage that they do not exhibit satisfactory bending properties. As a result of repeated bending in the seam area, cracks are produced in the laminated pages, which can lead to complete fracture.

EP 1 008 459 B2 reveals an arrangement for reinforcing the area of the seam in which, firstly, a reduction in the thickness of the laminate layers close to the seam area is provided. The tab which is fixed to the reduction close to the seam area is held in relation to the laminate layers of the personalization data page by a closure element. As a result, by means of clamping, a tab of more flexible material and a personalization data page having a laminate layer sheath are joined to each other. This document has the disadvantage that the production is very complicated and that there is again a risk of fracture in the transition region between the tab and the laminate layer sheath of the personalization data page.

The invention is therefore based on the object of providing a fold area for an interleaf which exhibits satisfactory bending properties.

This object is achieved by the interleaf according to the invention, the device according to the invention and the method according to the invention for producing the interleaf. Further advantageous embodiments and developments are provided in claims referring back to the respectively independent claims.

The interleaf according to the invention has the advantage that all the layers of the interleaf are firmly connected to one another and a smooth transition region is provided between the fold area and the at least one further layer which is applied to at least one layer of a thermoplastic elastomer. As a result of the smooth transitions, preferably provided on an upper side and an underside, good bending properties are achieved and the formation of cracks in the seam or fold area is avoided, which lead to fractures and, in the worst case, to detachment of a personalization data page or further data pages from the identity document.

Furthermore, the configuration of the interleaf according to the invention has the advantage that the fold area, which is provided to accommodate the seam, has a low overall thickness, which provides improved bending properties. The at least one layer of thermoplastic elastomer has a constant thickness in the fold area or a lower thickness than in other areas, in order to improve the bending properties. In addition, a simple structure and simple configuration of the layers for the production of an interleaf are provided.

According to an advantageous embodiment of the interleaf, provision is made that, on one side of the at least one layer of thermoplastic elastomer, there are arranged at least two further layers, which each have a seam side edge running substantially parallel to the seam, the seam side edge of the first further layer, adjoining the layer of thermoplastic elastomer directly, extending less far toward the fold area than the at least one further layer. This makes it possible for the at least one further layer to cover the first further layer resting directly on the layer of thermoplastic elastomer, and the fold area is formed with a reduced cross section. At the same time, complete protection is provided for the at least first further layer.

According to an advantageous refinement of the invention, the fold area is formed by a transition region which is formed between a seam side edge of the first further layer and a seam side edge of the at least second further layer covering this layer and which is provided in the manner of a step, rounded, corrugated, in the manner of a segment with identical or different graduations and/or profiles. As a result, depending on the materials used for the further layers and their thicknesses or spacing from the seam side edge, it is possible to form different transition regions which exhibit very good bending properties and avoid the formation of cracks.

According to a further advantageous refinement of the invention, provision is made for the at least one further layer to extend completely over the fold area and to rest on or be pressed into the layer formed of thermoplastic elastomer. As a result, a smooth transition region can likewise be provided between the fold area of the at least one further layer which is applied to at least one layer formed of a thermoplastic elastomer. Provision is preferably made for the at least one further layer which is applied to the layer formed of thermoplastic elastomer to be pressed in at least partly, in particular completely, in the seam area, so that the original thickness of the layer of thermoplastic elastomer is maintained in the seam area, in order to permit easy bending and straightforward sewing in.

According to a further advantageous refinement of the interleaf, provision is made for the at least one further layer and/or the at least one layer of thermoplastic elastomer to have an embossing in the fold area. As a result, the fold area can be provided with one or more security features, which means that manipulation by separating the at least one further layer from the at least one layer of thermoplastic elastomer becomes visible.

The interleaf according to the invention is formed as a data page which is personalized. In this case, image data, letters and numbers as well as codes, bar codes or the like can be introduced. The interleaf can additionally have various security features, such as tilt images or holograms, and be provided in the formats ID-1, ID-2 or ID-3 or further formats and also have further security features.

By means of the process according to the invention for the production of an Interleaf, in particular for a book-like identity document, simple and cost-effective production of the interleaf is made possible. The individual layers for the production of an interleaf are joined to one another in a lamination process. In this case, at the same time a smooth transition from the at least one further layer to the at least one layer of thermoplastic elastomer in the fold area is made possible. As a result, a flexible configuration of the fold area can be produced without subsequent work. Furthermore, prior processing of the at least one layer of thermoplastic elastomer and of the at least one further layer is not required.

The at least one further layer which is provided above or below on the at least one layer of thermoplastic elastomer is joined by means of pressing during the binding or lamination of the layers resting on the at least one layer of thermoplastic elastomer, or is at least partly pressed into the layer of thermoplastic elastomer. As a result, a flush or smooth transition with an interruption-free surface can be created.

Advantageously, the at least one further layer and the layer of thermoplastic elastomer in the transition region are at least partly adhesively bonded, fused or welded to one another, so that an at least partly cohesive joint is created.

Furthermore, according to an alternative embodiment of the invention, provision is made that, during the lamination of the at least one further layer to the at least one layer of thermoplastic elastomer, the fold area is deformed in such a way that an interruption-free transition is created. As a result, in addition to the fold area, the region adjacent thereto on the outside can also be deformed and reconfigured.

In order to carry out the process according to the invention and the production of an interleaf, in particular for a book-like identity document, according to the invention a laminating mold is provided which has at least one die which is elevated with respect to the laminating mold and, during the lamination of the layers in the fold area, positions the at least one further layer without interruption in relation to the at least one layer of thermoplastic elastomer. This die permits the configuration of the fold area with very good bending properties. The layers can be introduced during one operation by this laminating mold having at least one die.

Provision is advantageously made for the die to be formed as a metal strip, which is provided on the laminating mold by means of adhesive bonding, soldering, welding, stapling, crimping, riveting or a magnetic holding force. As a result, cost-effective production of a laminating mold is provided, the use of which can be adapted variably to different fold areas and geometries of the fold areas. Alternatively, in the plastic injection molding process, dies can also be formed, such as from Teflon, PEEK, PET, PE or from generically related plastics, which are provided with and without fabric inlays. Furthermore, ceramic materials, composite ceramic materials or silicone-containing materials can be used. Furthermore, the die can be produced by means of formation by electroplating, material-removing processes or the like. Furthermore, the die can comprise a surface age-hardened layer which is formed as a protective and/or anti-adhesion layer. For example, plastics such as Teflon or other materials can be used.

The cross section of the die is advantageously matched to the desired geometry of the fold area, so that, during the production of the fold area by the die, the geometry is imaged on the fold area. The die is preferably formed from spring strip steel or steel sheet and can comprise different thicknesses in the μm range. Likewise, the die can be formed in many parts both in terms of width, thickness and/or length.

Figure 2:
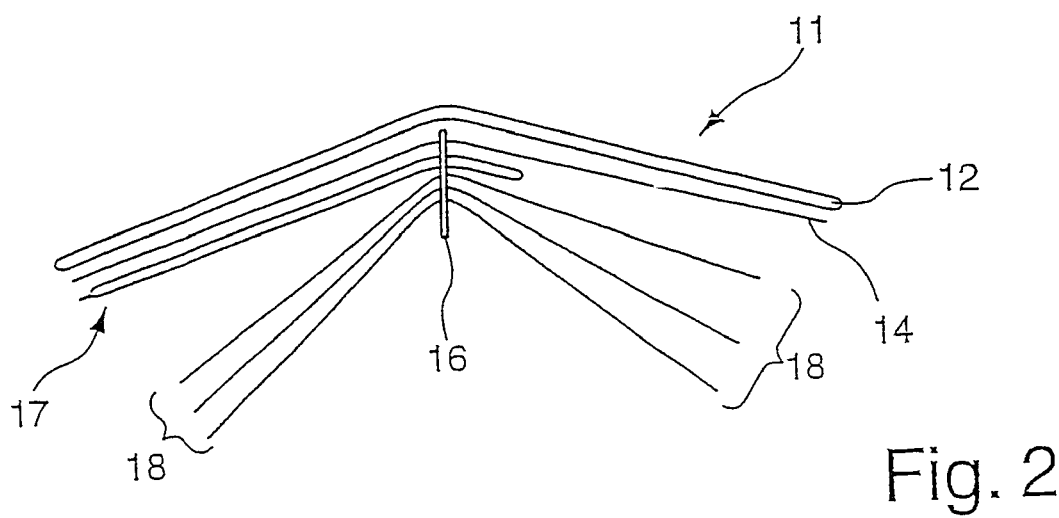
Figure 3A:
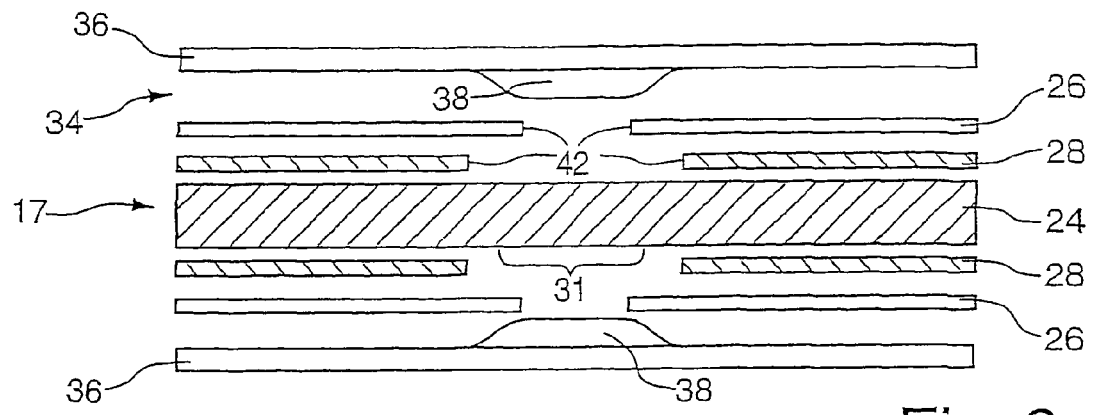
Figure 3B:
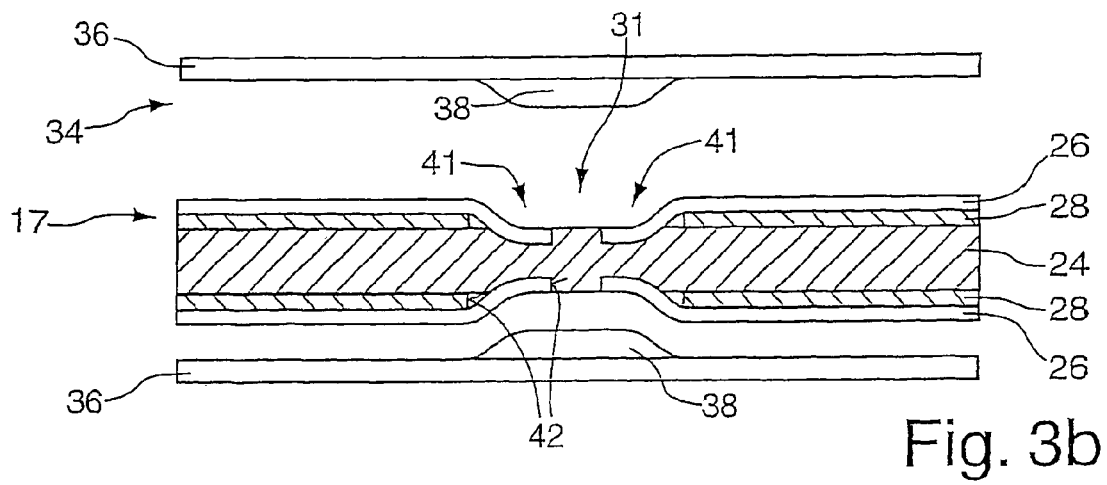
Figure 3C:
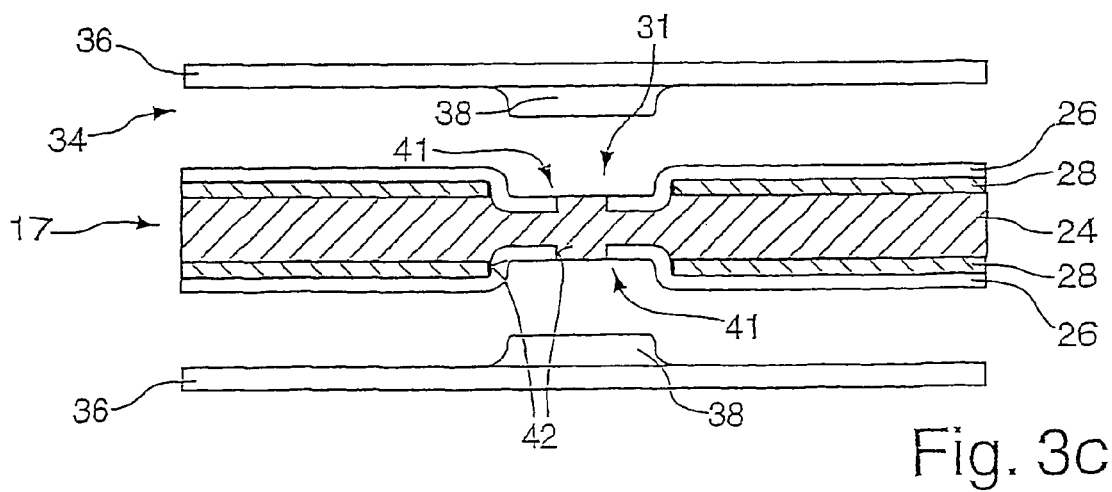
Figure 3D:
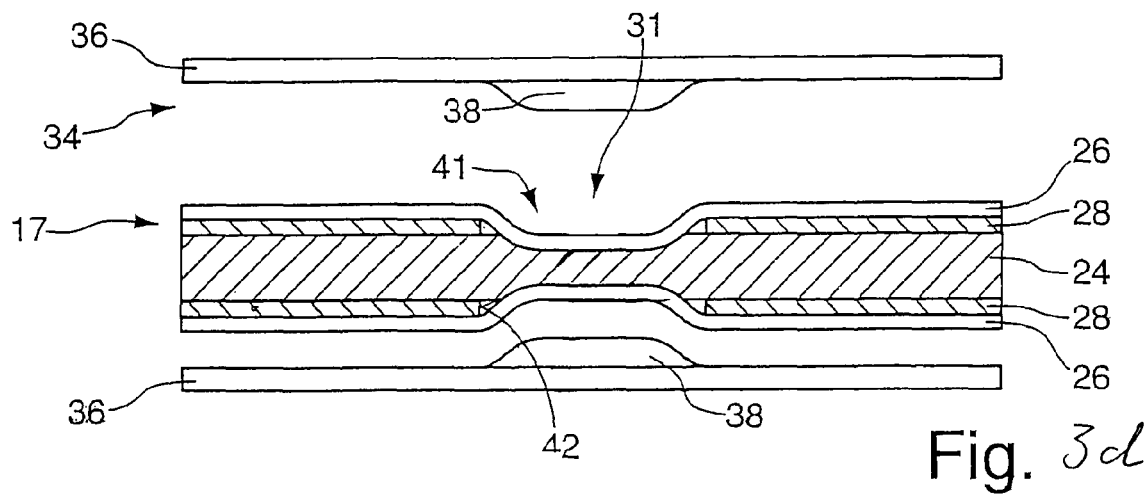
Figure 3E:
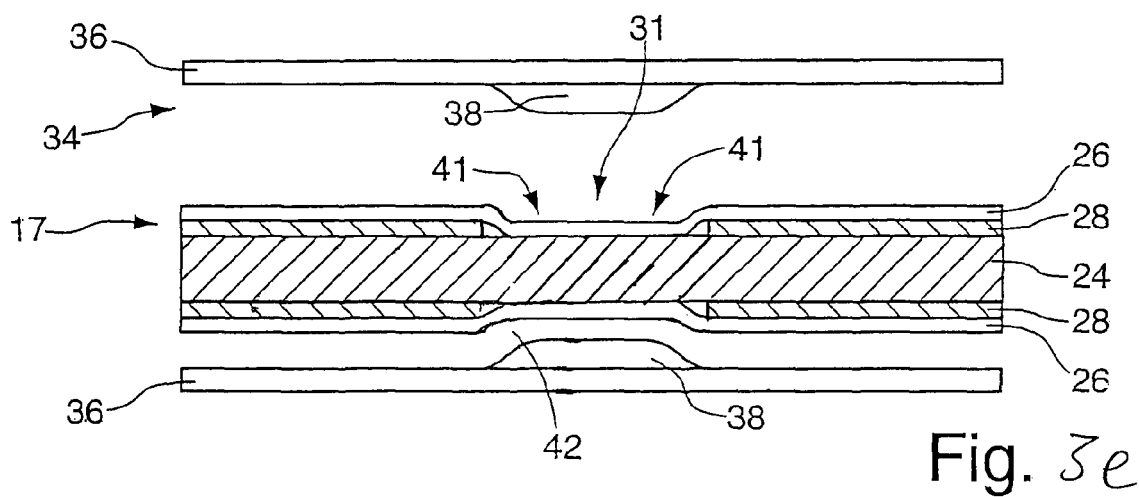
Figure 4A:
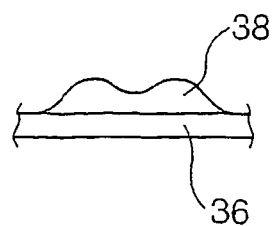
Figure 4B:
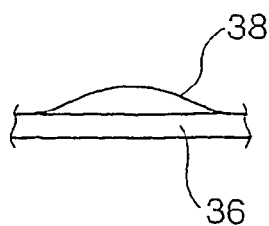
Figure 4C:
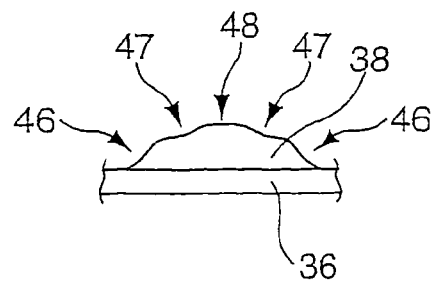
Figure 5:
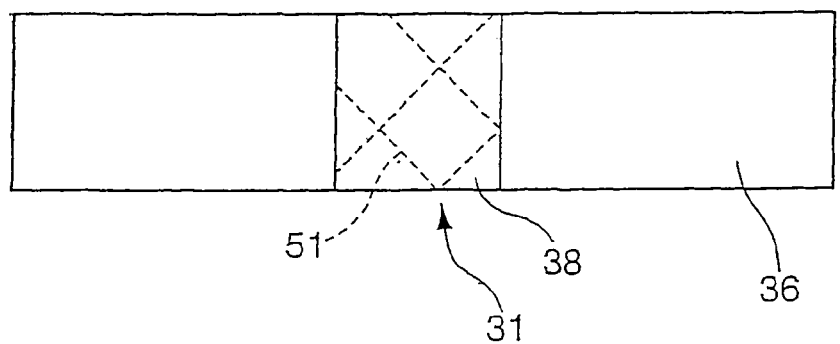

The invention and further advantageous embodiments and developments of the same will be described and explained in more detail in the following text by using the examples illustrated in the drawings. The features to be gathered from the description and the drawings can be employed on their own or in a plurality in any desired combination according to the invention. In the drawing:

FIG. 1 shows a perspective illustration of an identity document having an interleaf according to the invention, FIG. 2 shows a schematic plan view of the identity document according to FIG. 1, FIG. 3a shows a schematic sectional illustration of a first step in the process according to the invention for the production of an interleaf, FIG. 3b shows a schematic sectional illustration of an interleaf according to the invention after the process has been carried out, FIGS. 3c-e show schematic sectional illustrations of alternative embodiments of an interleaf according to the invention after the process has been carried out, FIG. 4a shows a schematic sectional illustration of a detail from a laminating mold according to the invention, FIG. 4b shows a schematic sectional illustration of an alternative embodiment to FIG. 4a, FIG. 4c shows a schematic sectional illustration of a further alternative embodiment to FIG. 4a, and FIG. 5 shows a schematic plan view of a laminating mold according to the invention having a die.

In FIGS. 1 and 2, an identity document 11 is illustrated, such as a passport. The identity document 11 comprises a book binding 12, such as a book cover of a book. Provided on an inner side is an end paper 14, which is fixed to the book binding 12. An interleaf 17 and a plurality of data pages 18 are joined to an end paper 14 via a common seam 16. The data pages 18 are, for example, inner pages of the book-like identity document 11 and are used to hold visas or other stamps.

The interleaf 17 is formed as a personalization data page. A personalization data page can be formed, for example, in accordance with the ICAO standard and comprises a photograph 19 of the document holder, an OCR machine readable ICAO line 21 and further personalization data 22.

In FIG. 3a, a schematic sectional illustration of a first embodiment according to the invention of an interleaf 17 is illustrated. The interleaf 17 comprises a layer of thermoplastic elastomer as a middle layer and at least one further layer 26 above and below the layer 24. In between them, for example at least one first further layer 28 is provided. The further layers 26, 28 are preferably composed of high-temperature stable plastic. The middle layer 24 is constant in cross section. The at least first further layer 28 extends with a seam side edge 42 as far as a fold area 31, which extends to the left and right of the seam 16. The at least one further layer 26 extends beyond the at least first further layer 28 into the fold area 31. The edges 42 of the layer 26 pointing toward the seam are arranged at a distance from each other, so that a middle free region is formed, in which the seam 16 is introduced into the at least one layer 24 of thermoplastic elastomer.

The thermoplastic elastomer used can preferably be thermoplastic polyurethane (TPU). However, other thermoplastic elastomers can also be used. For this purpose, all of the group of thermoplastic polyurethanes, the group of thermoplastic co-polyesters and the group of thermoplastic polyether block amides are available. The high-temperature stable plastics used can be, for example, polycarbonate (PC), polyether sulfone (PES), polyether ketone (PEEK), polyphenylene oxide (PPO), polyphenylene sulfide (PPS), polyethylene terephthalate (PET), polybutylene terephthalate (PBT), polyoxymethylene (POM), polysulfone (PSU), polyether imide (PEI) or polyamide (PA). These high-temperature stable plastics can be used individually or in combination as a further layer 26, 28.

In the at least one layer 24 of thermoplastic elastomer, for example a transponder unit can be fitted or embedded, the layer thickness of the layer 24 being adapted as a function of the use. Advantageously, the at least one layer 24 of the thermoplastic elastomer in the fold area 31 has a layer thickness between 100 μm and 500 μm. The further layers 26, 28 of the high-temperature stable plastic can have a layer thickness between 20 µm and 500 µm. At least one of the layers 24, 26, 28 can have further security features, such as a security print, an embossing, optically variable devices (holograms) or the like.

For the purpose of production, the interleaf 17, which can be produced as a single or multiple blank and which comprises the individual layers 24, 26 and 28, is laid on a lower laminating mold 36 in a schematically illustrated device 34, for example a heatable press. An upper laminating mold 36 is fed on to the lower laminating mold 36 and, by means of pressure and heat, the individual laminate layers 24, 26, 28 are bound or joined to one another.

In FIG. 3b, the first embodiment of a finally produced interleaf 17 is illustrated with the laminating molds 36 raised off the interleaf 17. The at least one further layer 26 of high-temperature stable plastic is arranged in the fold area 31 with its outer surface flush with the outer surface of the fold area 31. The further layer 26 is pressed into the at least one layer 24 of thermoplastic elastomer. As a result, a smooth transition from the further layer 26 to the one layer 24 is created, which creates a stable arrangement that is free of crack formation. A transition region 41, which extends between seam side edges 42 pressed in and belonging to the at least one further layer 26 and the first further layer 28, is rounded or formed in an approximately S shape, according to a first embodiment. By means of the smooth transitions, an arrangement that is stable and can be folded easily can be provided.

In an embodiment that is not specifically illustrated, provision can be made for the at least one layer 24 of thermoplastic elastomer to be tapered in the fold area 31 or to comprise appropriate depressions to accommodate the at least one further layer 26.

In FIG. 3c, an alternative embodiment of a transition region 41 of an interleaf 17 is illustrated in comparison with FIG. 3b. The transition region 41 is formed step-like. This embodiment can preferably be formed in the case of an at least one first further layer 28 that is thick as compared with the further layer. This stepped arrangement likewise permits a closed arrangement for a laminate layer sheath.

In FIG. 3d, an alternative embodiment to FIGS. 3b and c is illustrated. In this embodiment, provision is advantageously made for the layer 26 to be continuous and to extend completely over the fold area 31. In this embodiment, in analogy with FIG. 3b and c, provision is made for the layer 26 to be pressed completely into the layer 24 formed from thermoplastic elastomer.

In FIG. 3e, an alternative embodiment to FIG. 3d is illustrated. In this embodiment, the layer 26 in the fold area 31 is fixed so as to rest on the layer 24. This embodiment can be advantageous, for example, if a reinforced and slightly stiffer fold area 31 is to be formed.

The transition regions 41 in FIGS. 3d and e can be produced by means of laminating molds, as described for example in relation to FIGS. 3a to c or described in the following FIGS. 4 and 5.

Further alternative embodiments of the transition region can be provided and are determined by the cross-sectional geometry of dies 38 arranged on the laminating mold 36.

The laminating mold 36 is for example constructed from sheet metal or the like and holds the die 38 by means of a firm connection, such as by means of welding, soldering, adhesive bonding, riveting, crimping or by means of a detachable connection, such as magnetization, latching. The cross-sectional geometry of the die 38 is matched to the configuration of the fold area 31. The die according to FIG. 3a comprises rounded edges, which creates soft and smooth transitions. The embodiment of the die 38 according to FIG. 3c is stepped, which creates a step transition region 41 of the fold area 31.

In FIGS. 4a to 4c, further alternative cross-sectional geometries for a die 38 are illustrated by way of example. In FIG. 4a, the die 38 comprises a corrugated shape. This makes it possible, for example, for the middle region of the fold area 31, in which the seam 16 is provided, to be thickened. By means of the alternative embodiment according to FIG. 4b, in which the die 38 has a convex profile, a tapered fold area 31 is produced. In FIG. 4c, a further alternative embodiment of the die 38 is provided which, for example, comprises a first rounded segment section 46, which firstly merges into a rectilinear segment section 47 having a low slope and then opens into a segment section 48 running horizontally. The die 38 is preferably designed mirror-symmetrically, so that the same segment section 46, 47, 48 is provided on the left and right of the seam 16.

In FIG. 5, a schematic plan view of a laminating mold 36 having a die 38 is provided. An embossing or elevation 51 is provided on the die 38. This embossing or elevation 51 is applied to the fold area 31 during the binding of the individual layers 24, 26, 28 and is used as a further security feature. Furthermore, via the die 38, insert parts composed of thermoplastic elastomer can additionally be introduced as a security feature. The configuration of the seam side edges 42 preferably runs in a straight line and is provided parallel to the seam 46. Further profiles, such as zigzag shaped, corrugated or the like, and also a non-parallel profile in relation to the seam 16, are likewise provided.

All the features described in the exemplary embodiments are in each case essential to the invention and can be combined with one another as desired.

The invention claimed is:

1. An interleaf, in particular for an identity document, which comprises a fold area for receiving a seam and further comprises at least one layer of a thermoplastic elastomer and at least one further layer, in which the at least one further layer extends in the direction of the interleaf plane substantially from the side opposite the seam as far as the fold area, and the at least one layer of thermoplastic elastomer extends into the fold area, wherein the at least one layer of thermoplastic elastomer has a thickness in the fold area equal to or less than in other regions, and in that, in relation to the at least one layer of thermoplastic elastomer, the at least one further layer has an interruption-free transition region to the fold area.

2. The interleaf as claimed in claim 1, wherein, on one side of the at least one layer of thermoplastic elastomer, there are arranged at least two further layers, which each have a seam side edge running substantially parallel to the seam, the seam side edges of the first further layer, adjoining the layer of thermoplastic elastomer directly, extending less far toward the fold area than the at least one further layer.

3. The interleaf as claimed in claim 1, wherein a transition region between a seam side edge of the at least first further layer and the seam side edge of the further layer in the fold area is formed in the manner of a step, rounded, corrugated, in the manner of a segment with identical or different graduations and/or profiles.

4. The interleaf as claimed in claim 1, wherein the at least one further layer extends completely over the fold area and rests on or is pressed into the layer of thermoplastic elastomer, so that the fold area is as thick or thinner than the thickness of the layer.

5. The interleaf as claimed in claim 1, wherein the at least one layer and/or the at least one further layer has an embossing or elevation in the fold area.

6. The interleaf as claimed in claim 1, wherein the at least one further layer is personalized.

7. A process for the production of an interleaf, which comprises at least one layer of a thermoplastic elastomer and at least one further layer and said at least one layer of a thermoplastic elastomer has a fold area which is provided for the fitting of a seam during the finishing of the identity document, wherein the at least one further layer is arranged above or below or on both sides the at least one layer of thermoplastic elastomer and extends as far as or into the fold area, and in that the transition region of the at least one further layer which extends into the fold area is laminated flush with the outer side of a fold area with a laminating mold.

8. The process as claimed in claim 7, wherein the at least one first and further layer are provided above and below the in relation to the at least one layer of thermoplastic elastomer, and the first further layer extends as far as the fold area and at least one further second layer extends into the fold area, in order to be bound jointly with the at least one layer of thermoplastic elastomer, the first layer resting on the layer and the at least second further layer being joined into the at least one layer, lying on or penetrating into the latter.

9. The process as claimed in claim 7, wherein, in the transition region, the layers are adhesively bonded, fused or welded to one other.

10. A device for the production of an interleaf, which comprises at least one layer of thermoplastic elastomer and at least one further layer, which are joined to one another by an upper and lower laminating mold, and said at least one layer of a thermoplastic elastomer has a fold area which is provided for the fitting of a seam during the finishing of the identity document, wherein, in the fold area of the interleaf, the laminating mold has a die which is elevated in relation to the laminating mold.

11. The device as claimed in claim 10, wherein the die is formed from metal, plastic, ceramic strips or from a strip of composite material or silicone-containing material.

12. The device as claimed in claim 10, wherein the die is provided on the laminating mold by means of adhesive bonding, soldering, welding, stapling, crimping, riveting or a magnetic holding force, or is produced by an application or removal process, in particular an electroplating process or material-removing machining.

13. The device as claimed in claim 10, wherein the cross section of the die is matched to the cross-sectional geometry of the fold area.

14. The interleaf as claimed in claim 1, wherein the at least one layer of thermoplastic elastomer comprises a larger thickness in all other areas of the interleaf than in the fold area.

15. The interleaf as claimed in claim 7, wherein the transition region of the at least one further layer which extends into the fold area is laminated flush with the outer side of a fold area with a laminating mold so that in all other areas of the interleaf than in the fold area a larger thickness of the interleaf is provided.

* * * * *